US008475259B2

(12) United States Patent
Weber

(10) Patent No.: US 8,475,259 B2
(45) Date of Patent: Jul. 2, 2013

(54) REEL ADD-ON SYMBOLS FOR SIMULTANEOUSLY PLAYING TWO GAMES

(75) Inventor: Franz Weber, Dobl (AT)

(73) Assignee: Spielo International Canada ULC, Moncton, New Brunswick (CA)

( * ) Notice: Subject to any disclaimer, the term of this patent is extended or adjusted under 35 U.S.C. 154(b) by 1016 days.

(21) Appl. No.: 12/163,628

(22) Filed: Jun. 27, 2008

(65) Prior Publication Data

US 2009/0325667 A1 Dec. 31, 2009

(51) Int. Cl.
*A63F 9/24* (2006.01)
*A63F 13/00* (2006.01)
*G06F 19/00* (2011.01)
*G06F 17/00* (2006.01)

(52) U.S. Cl.
USPC ........ 463/20

(58) Field of Classification Search
USPC ........ 463/20
See application file for complete search history.

(56) References Cited

U.S. PATENT DOCUMENTS 6,394,902 B1 * 5/2002 Glavich et al. .......... 463/20
6,702,671 B2 * 3/2004 Tarantino .......... 463/20
6,960,134 B2 * 11/2005 Hartl et al. .......... 463/20
7,361,089 B2 * 4/2008 Daly et al. .......... 463/20
7,377,850 B2 * 5/2008 Shackelford et al. .......... 463/20
7,591,724 B2 * 9/2009 Baerlocher .......... 463/20
7,794,317 B2 * 9/2010 Kaminkow et al. .......... 463/16
2002/0055382 A1 * 5/2002 Meyer .......... 463/20
2002/0065124 A1 * 5/2002 Ainsworth .......... 463/20
2003/0216165 A1 * 11/2003 Singer et al. .......... 463/20
2004/0242313 A1 * 12/2004 Munoz .......... 463/20
2008/0081688 A1 * 4/2008 Plowman .......... 463/20
2008/0182650 A1 * 7/2008 Randall et al. .......... 463/25
2008/0287179 A1 * 11/2008 Berman et al. .......... 463/20
2009/0124364 A1 * 5/2009 Cuddy et al. .......... 463/27
2009/0215521 A1 * 8/2009 Borissov et al. .......... 463/20
2009/0275382 A1 * 11/2009 Vallejo et al. .......... 463/20
2010/0056252 A1 * 3/2010 Englman et al. .......... 463/20

* cited by examiner

*Primary Examiner* — Xuan Thai
*Assistant Examiner* — Michael Grant
(74) *Attorney, Agent, or Firm* — Patent Law Group LLP; Brian D. Ogonowsky

(57) ABSTRACT

A reel-type secondary game is played simultaneously with a conventional reel-type main game on a gaming machine. The secondary game is initiated only after the player meets certain criteria, such as betting additional credits. Once the secondary game is initiated, one or more special symbols are added to the leftmost reel and the rightmost reel used in the main game, but not the reels in-between. The added special symbols do not affect the symbols used in the main game. All the reels containing the symbols used in the main game and the one or more special symbols are rotated and randomly stopped. Awards are granted for winning symbol combinations obtained in the main game. If the special symbols align with a certain stop position, a special bonus game is played or the player wins a progressive jackpot.

11 Claims, 6 Drawing Sheets

REEL ADD-ON SYMBOLS FOR SIMULTANEOUSLY PLAYING TWO GAMES

FIELD OF THE INVENTION

This invention relates to gaming devices, such as slot machines, and, in particular, to a reel-type secondary game played along with the main reel-type game.

BACKGROUND

Common slot machines randomly select and display an array of symbols on a video screen, then grant an award to a player based on the occurrence of certain symbol combinations across pay lines. Typically, the game ends after the symbols are displayed and the award, if any, is granted. Although these types of games are highly successful, it is advantageous to provide an additional feature to this basic game to make the game more interesting to a player. A more interesting game will generate increased revenue to the casino by its increased play.

SUMMARY

Disclosed herein is a secondary game that is played simultaneously with a conventional reel-type main game on a gaming device. The gaming device may be a video slot machine or a video monitor connected to a computer for on-line gaming. The main game displays a randomly selected array of symbols on virtual reels. In one embodiment, the array is 5×3 symbol positions. The combinations of symbols across one or more activated paylines are evaluated by a processor to determine an award to be granted. The present invention adds an additional feature to this conventional operation of a gaming machine.

One embodiment of the present invention allows the player to bet additional credits to play a secondary game along with the main game. Other criteria for playing the secondary game may be used.

In one example, the secondary game played along with the main game determines whether or not the player will play a bonus Deal or No Deal type game after the main game is completed. Any other feature can be initiated by a successful outcome of the secondary game played along with the main game.

In one embodiment, after the player has made a normal bet for the main game and wagered additional credits (a side bet) for playing the secondary game, one or more special symbols are added onto the outer two reels of the main game (e.g., reels 1 and 5). The special symbols do not replace the regular symbols but may be shown next to the regular symbols. A pointer identifies the require stopping position(s) of the special symbols in order to win the secondary game.

Prior to the special symbols being added onto the reels, the special symbols may appear on the reels as semi-transparent or a certain color to represent that they are not activated, so the player sees where the special symbols would be added if the side bet were made. This also allows the player to see if she would have won the secondary game if she had made the side bet for the previous spin.

All the reels, containing the regular symbols and the added special symbols, then spin and randomly stop. When the reels stop, normal awards are granted for winning symbol combinations of the regular symbols. If a certain number (e.g., 1 or 2) of the special symbols align with the pointer, the player wins the secondary game, and the associated special feature (e.g., a bonus game or jackpot) is awarded.

Accordingly, in such an embodiment, the symbol add-on game is played simultaneously with the main game and does not interfere with the main game. Therefore, no extra time or screen space is required to be taken up by the secondary game, and the main game does not have to be re-evaluated by a regulatory agency if the secondary game is added to the main game by a software upgrade.

In another embodiment, instead of the special symbols being added onto the end reels, two extra reels are added (e.g., reels 0 and 6) that only contain a few of the special symbols. These reels rotate and stop along with the regular reels 1-5. If the special symbols align with pointers, the player wins the secondary game. Accordingly, as in the previous embodiment, the secondary game is played simultaneously with the main game and does not interfere with the main game.

Other embodiments are described.

DETAILED DESCRIPTION

Figure 1:
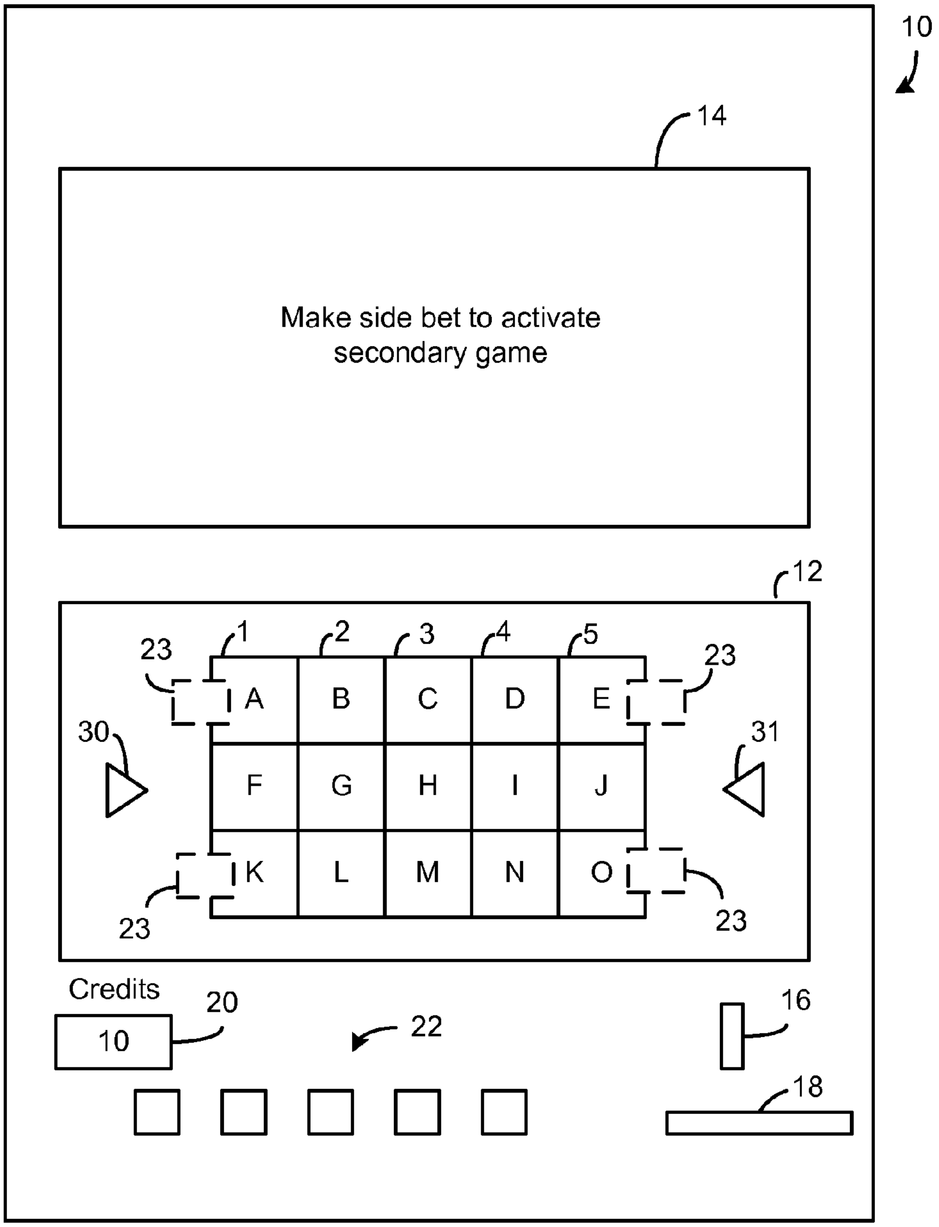
FIG. 1 illustrates a gaming machine that displays a game in accordance with the present invention.

Although the invention can typically be implemented by installing a software program in most types of modern video gaming machines, one particular gaming machine platform is shown in FIG. 1.

Machine 10 includes a display 12 that may be a thin film transistor (TFT) display, a liquid crystal display (LCD), a cathode ray tube (CRT), or any other type of display.

An optional second display 14 may provide information, such as an advertisement for the game, the rules of the game, pay tables, pay lines, or other information, or may display a bonus game while the main game is displayed on display 12. In one embodiment, displays 12 and 14 have a touch screen feature that enables the player to make selections by touching a displayed icon.

A coin slot 16 accepts coins or tokens in one or more denominations to generate credits within machine 10 for playing games. A slot 18 receives bills or machine readable printed tickets and outputs printed tickets for use in cashless gaming.

A credit meter 20 identifies the current credits in the machine 10.

Player control buttons 22 include any buttons needed for the play of the particular game or games offered by machine 10 including, for example, a bet button, a repeat bet button, a spin reels button, a maximum bet button, a side-bet button, a cash-out button, a display paylines button, a display payout tables button, select icon buttons, and any other suitable button. A touch screen with virtual buttons may be used instead of physical buttons.

The display 12 shows reels 1-5, displaying a conventional 5×3 array of symbols. There may be an array of 3×3 symbols, an array of 5×4 symbols, or any other arrangement of symbols. Conventional paylines extend across the five reels. A paytable ROM determines the award to the player for achieving a winning combination of symbols across the five reels on an activated payline. Conventional paylines include horizontal as well as angled paylines across all five reels. Sample symbols A-O are shown as the displayed symbols for simplicity. The standard 5×3 symbol combination game is referred to herein as the main game.

For the player to participate in the secondary game, there may be additional criteria, such as the player making side bets, or the player playing a certain number of games (e.g., 10 games), or other criteria. In the example of FIG. 1, the player activates the secondary game with a single side bet of, for example, one extra credit.

The secondary game involves special symbols being added onto the reels. In one embodiment, non-activated special symbols appear on the reels as semi-transparent or a certain color, represented by dashed-outline blocks 23, to represent that they are not yet added to the reels, so the player sees where the special symbols would be added if the side bet were made. The blocks 23 rotate with the reels. This also allows the player to see if she would have won the secondary game if she had made the side bet for the previous spin. There may be more of the non-activated special symbols around the reels that are not shown in the 5×3 array.

Figure 2:
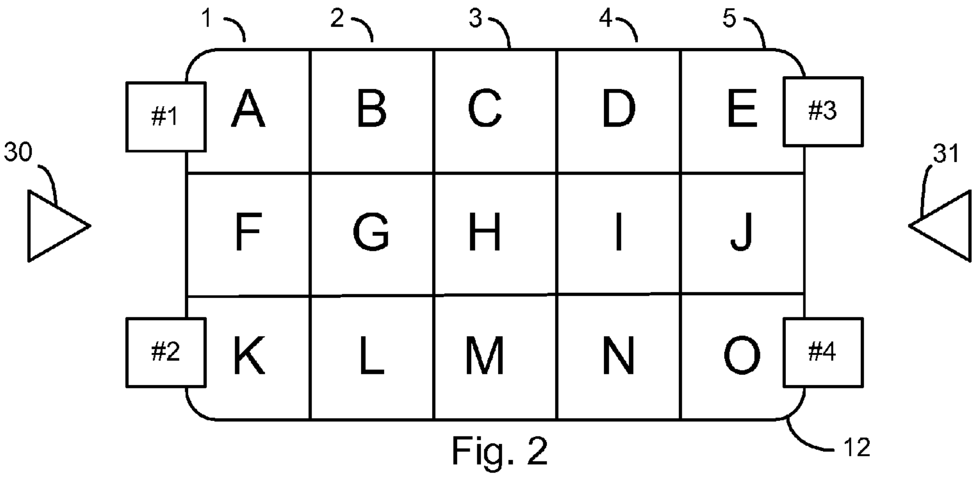
FIGS. 2-4 illustrate a video screen of the machine of FIG. 1 displaying a 5×3 array of symbols, where up to four special symbols may be added on the end reels to play a secondary game.

FIG. 2 illustrates the display 12 prior to a spin of the reels 1-5 and after the player has made the side bet. The side bet causes four special symbols #1, #2, #3, and #4 to effectively attach to the reel positions containing the symbols A, K, E, and O, respectively. There may be additional special symbols added to the outer reels that are not shown in the 5×3 array. In one embodiment, all the dashed-outline blocks 23 in FIG. 1 around the outer reels become solid special symbols or change color to represent that they are now added to the reels.

Pointers 30 and 31 identify the require positions of special symbols after the reels spin and stop in order for the player to win the secondary game. In the example, one of the special symbols #1 or #2 on reel 1 (or other added special symbols on reel 1) must align with pointer 30, and one of the special symbols #3 or #4 on reel 5 (or other added special symbols on reel 5) must align with pointer 31, in order for the player to win the secondary game.

Figure 3:
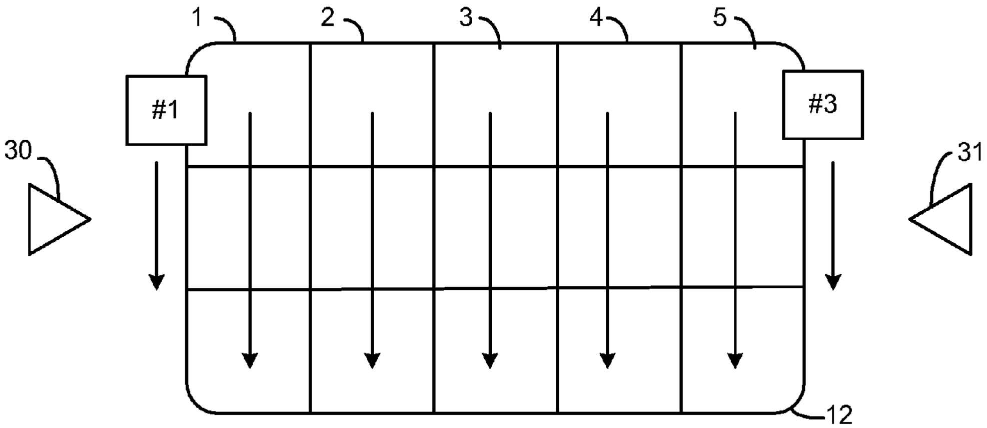

In FIG. 3, the player has pushed the spin-reels button or pulled a lever, and all reels spin. All the added special symbols (e.g., symbols #1-#4) move along with the rotation of reels 1 and 5 since they remain attached to the symbols A, K, E, and O (and other main game symbols) from FIG. 2.

Figure 4:
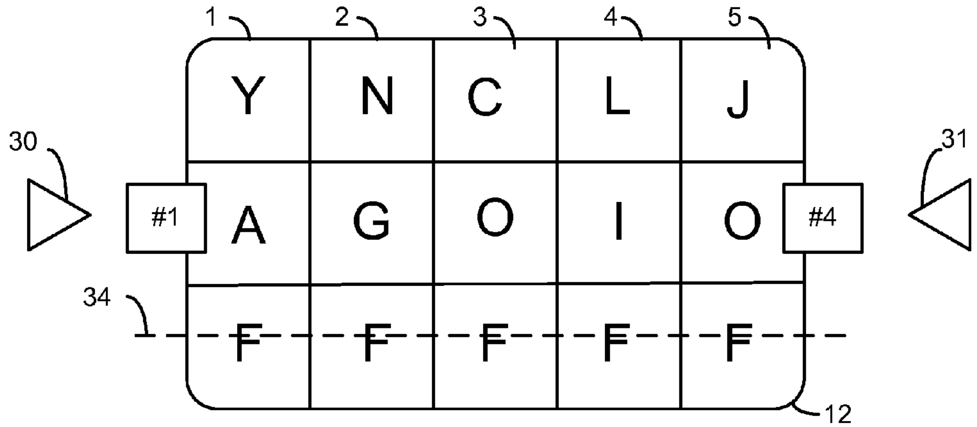

In FIG. 4, the reels 1-5 have randomly stopped. In the example, the player has won a conventional award for achieving a combination of five F symbols across the bottom horizontal payline 34. The player is then paid the award.

Also in the example of FIG. 4, the special symbols #1 and #4 have aligned with the pointers 30 and 31, so the player wins the secondary game. In one embodiment, had the player not won the secondary game, all the special symbols would have been extinguished, and the player would have to make another side bet on the next game to participate in the secondary game.

Figure 5:
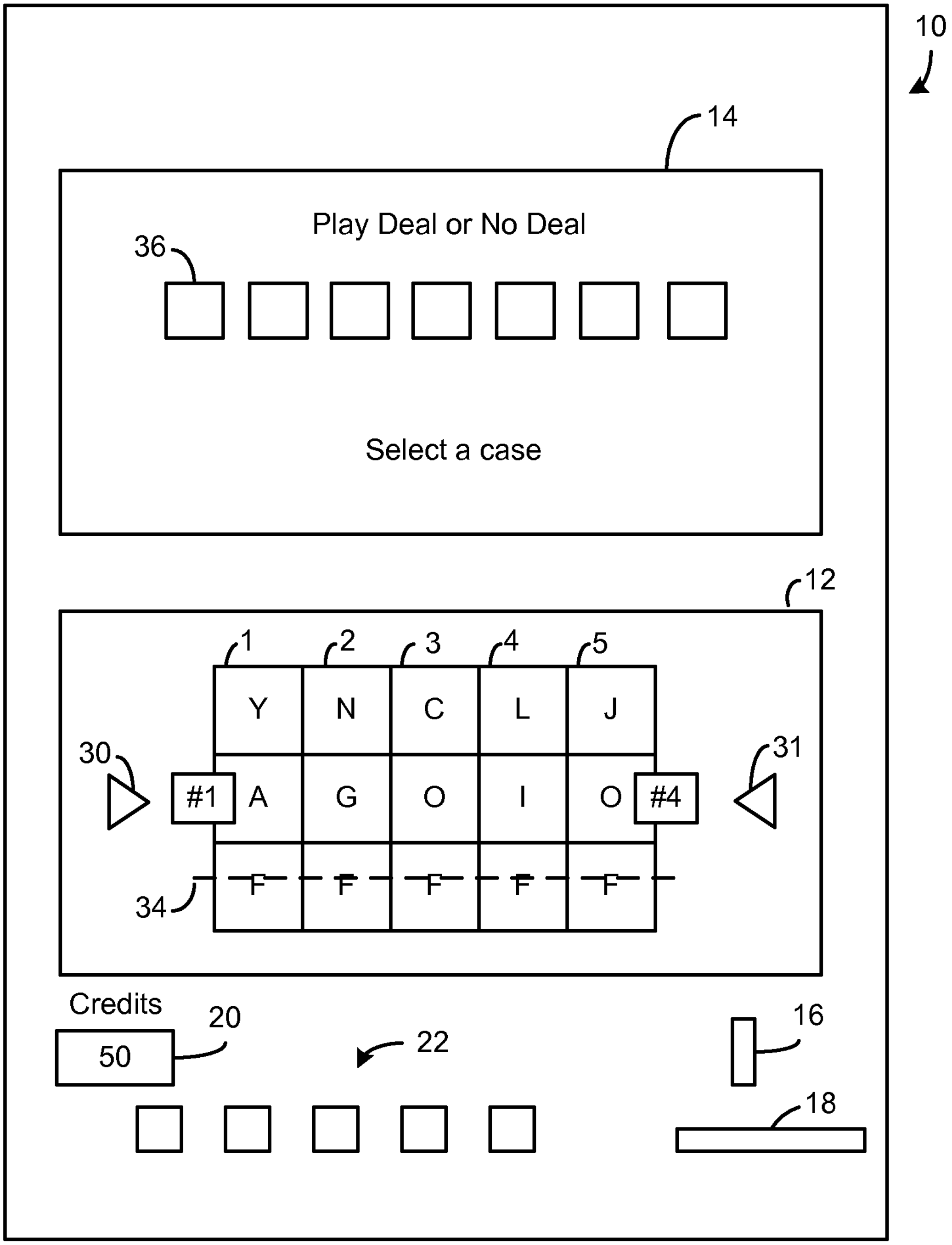
FIG. 5 illustrates the machine of FIG. 1 after the player has won the secondary game using the add-on symbols, which initiates a bonus game, such as a Deal or No Deal game.

FIG. 5 illustrates the gaming machine 10 displaying the symbols from FIG. 4. It is assumed that winning the secondary game initiates the bonus game Deal or No Deal, displayed in the top display 14. In such a game, the player first selects a suitcase icon 36 containing an unknown number of credits, and that amount remains hidden until the end of the game. The player is then asked to reveal the hidden values contained in the other suitcases by touching each suitcase. Before each selection, the player is offered a deal by the game computer so the player can either take the deal and end the game or continue selecting suitcases. The bonus game ends when the player either takes the deal or there are no unselected suitcases 36. Any other type of bonus game may be played upon a successful outcome of the add-on symbol game.

In one embodiment, the player immediately wins an award, such as a progressive jackpot, upon the special symbols aligning with the pointers 30 and 31. In another embodiment, only one special symbol needs to align with a pointer 30 or 31. In such an embodiment, if two special symbols aligned with the pointers 30 and 31, the values in the bonus game or the bonus award may double (or even quadruple) or the player plays the bonus game two or more times.

In another embodiment, each additional side bet by the player activates another special symbol add-on to the outside reels 1 and 5. The secondary game should be kept very simple since it is concurrent with the main game, and the player should be able to follow the secondary game in real time for maximum excitement.

In another embodiment, the player may add more special symbol to each of reels 1 and 5 by increasing her side bet to increase the chances of winning the secondary game. The pointers 30 and 31 can be in any position, and there may be up to three pointers, one for each of the three rows in the 5×3 matrix.

In another embodiment, one or more of the add-on symbols remain on the reel until used to win the secondary game or after a certain number of games (e.g., 5 games) have been played. If within the total of five games, a special symbol stops at both of the pointer positions, the player wins the secondary game. Thus, winning the secondary game would be accomplished incrementally.

In any case, the add-on special symbol game is performed concurrently with the main game and does not affect the main game. The add-on game may be self-funded by the side bets, or a portion of all bets used to play the main game and add-on game may be used to fund the add-on game. Since the main game is not affected by the add-on game, the main game does not have to be reapproved by a regulatory agency when the secondary game is added to an existing main game by a software routine. The add-on game can be easily added as a software routine to any main game.

In one embodiment, where the award for winning the secondary game is a progressive jackpot, the progressive jackpot may be accumulated from a percentage of bets made to play the main game and or the side bets for playing the add-on game.

In one embodiment, the secondary game is activated by the detection of the player playing above a threshold frequency of play over X games, or the secondary game is activated by the player agreeing to forfeit any wins based on low value symbols.

Figure 6:
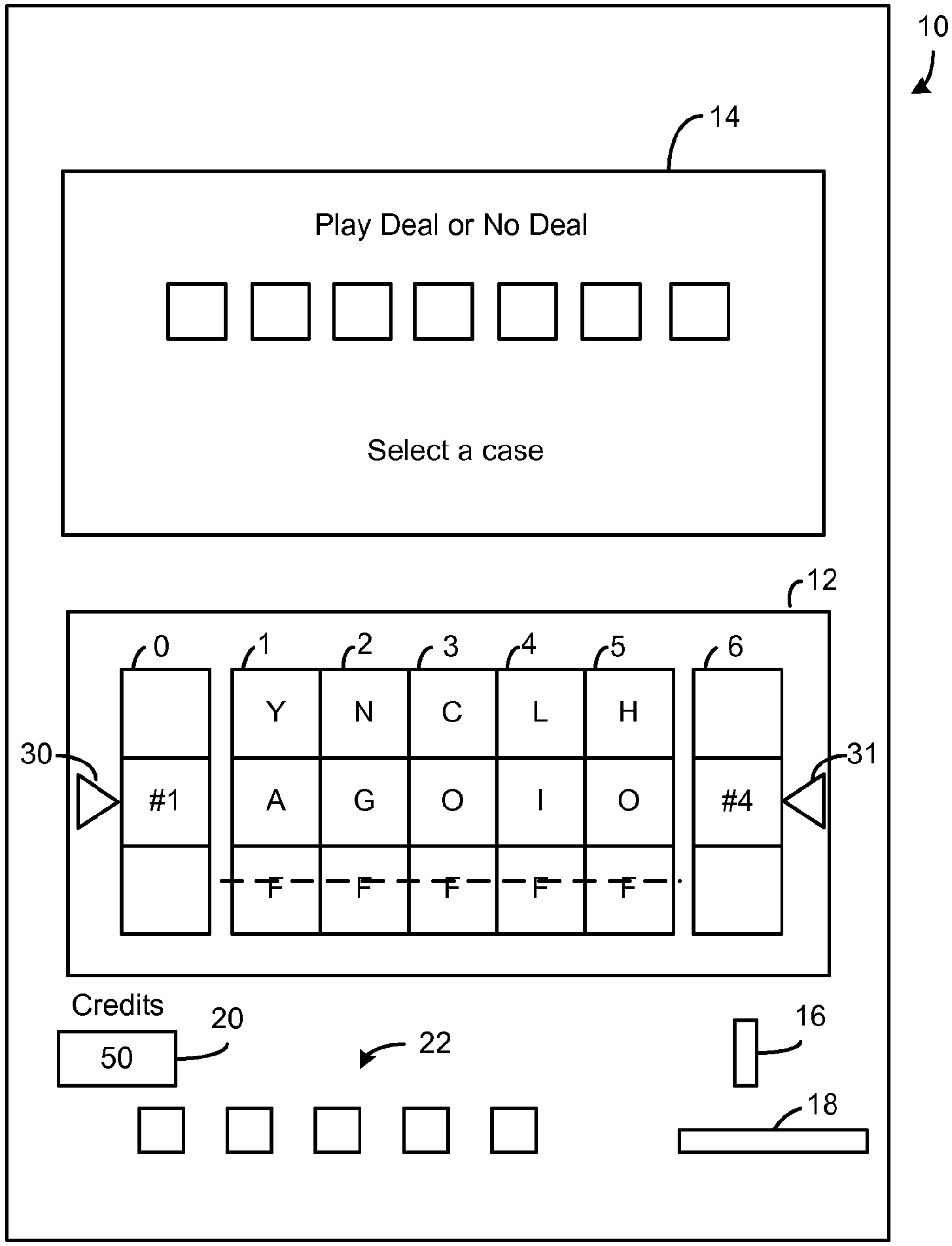
FIG. 6 illustrates another embodiment of the special symbol game where two outer reels are added containing one or more special symbols.

FIG. 6 illustrates another embodiment, where the special symbols (e.g., #1-#4) are not added to the outside reels 1 and 5 but are added to new reels 0 and 6 when the player makes the side bet or other criteria is achieved. The reels 0 and 6 may have the same number of positions as the other reels or may have a different number of positions. The special symbols would only be located at certain positions around reels 0 and 6. The reels 0 and 6 spin at the same time as reels 1-5. When the reels 0 and 6 stop, if a special symbol aligns with one or both of the pointers 30 and 31, the player wins the secondary game. The remainder of the game is the same as discussed above.

Many variations of this concurrent secondary game may be implemented without changing the main game.

Figure 7:
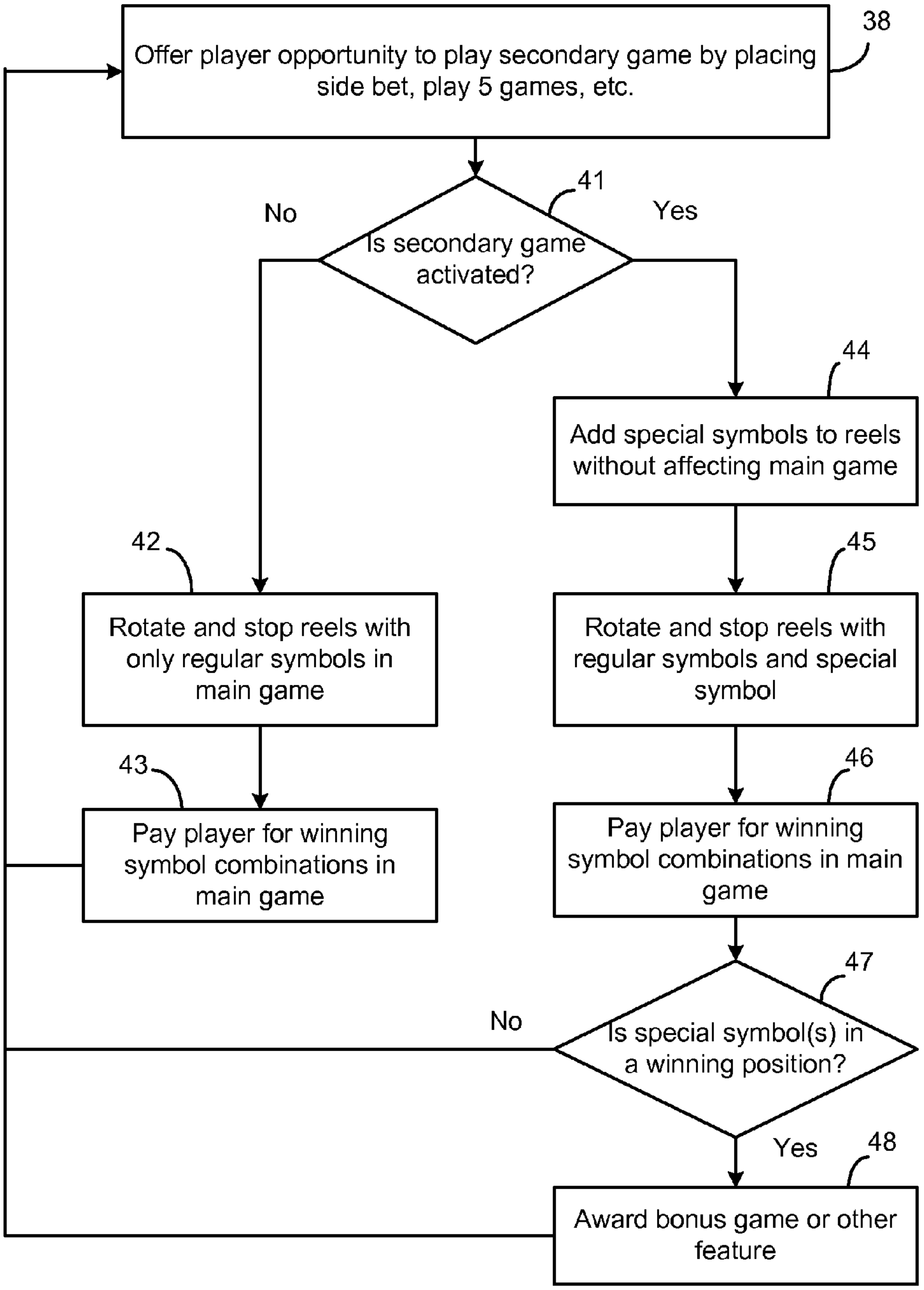
FIG. 7 is a flowchart illustrating one embodiment of the inventive method.

FIG. 7 is a flowchart summarizing basic steps carried out by a gaming machine in one embodiment of the invention previously described. In step 38, the player is offered an opportunity to play the secondary game concurrently with the main game by, for example, making a side bet, playing a certain number of games, playing a maximum bet a certain number of games, etc. In another embodiment, the secondary game is initiated by the player getting a certain outcome from a previous main game; however, this complicates the main game mathematics.

In step 41, it is determined whether the secondary game has been activated. If not, then the main game is carried out in the conventional way with the reels rotating and stopping (step 42), and awards being granted for winning symbol combinations across paylines (step 43).

If the secondary game has been activated, then, in step 44, special symbols are added to the main game reels without affecting the main game. Alternatively, one or more additional reels are displayed next to the main game reels, where the additional reel(s) display one or more special symbols.

In step 45, the all the reels are rotated and randomly stopped.

In step 46, the player is paid for winning symbol combinations in the main game using the regular symbols.

In step 47, it determined if the require number of special symbols (e.g., 1 or 2) have stopped at a winning position, such as a position identified with a pointer. If not, the game is over. If so, the player has won the secondary game, and either a special award is granted, a bonus game is granted, or other feature is granted (step 48).

Figure 8:
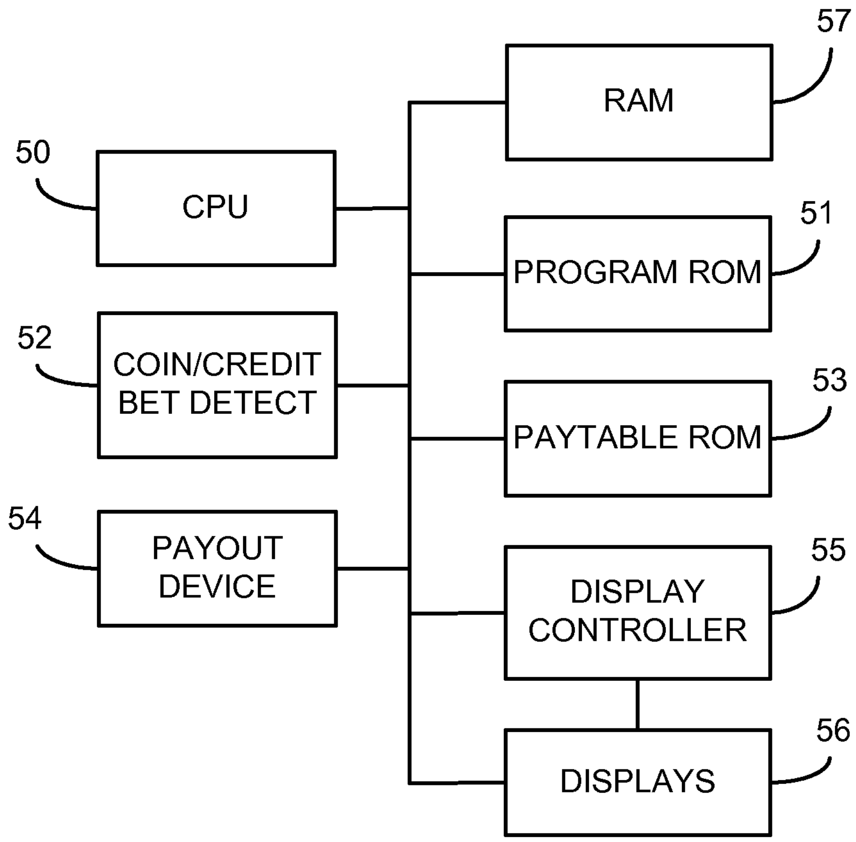
FIG. 8 is a block diagram of certain functional units in the gaming machine of FIG. 1.

FIG. 8 illustrates basic circuit blocks in a suitable gaming device. A control unit (CPU 50) runs a gaming program (including the invention) stored in a program ROM 51. The program ROM 51 may include a pseudo-random number generator program for selecting symbols and for making other random selections. A coin/credit detector 52 enables the CPU 50 to initiate a next game. A pay table ROM 53 detects the outcome of the game and identifies awards to be paid to the player. A payout device 54 pays out an award to the player upon termination of the game or upon the player cashing out. The payout may also be in the form of a coded paper ticket, credits on a smart card or magnetic strip card, coins, tokens, or in any other form. A display controller 55 receives commands from the CPU 50 and generates signals for the various displays 56. If a display 56 is a touch screen, player commands may be input through the display screen into the CPU 50. The portions of the program stored in ROM 51 that are to be accessed by the CPU 50 are first transferred into the RAM 57.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for carrying out a secondary game by a gaming device in conjunction with a main game, the main game comprising displaying a plurality of virtual reels side-by-side having symbols, where the reels, after being rotated and randomly stopped, display an array of symbols on a display screen, certain combinations of symbols along one or more activated paylines providing an award for a player, the plurality of reels comprising a leftmost reel, a rightmost reel, and one or more reels in-between, the secondary game method comprising:

initiating the secondary game only after the player has made an additional wager to play the secondary game independent of a wager for playing the main game;

adding one or more special symbols to reel positions only on the leftmost reel and the rightmost reel, but not the reels in-between, the added one or more special symbols not affecting a significance of symbols in the main game located at the same reel positions as the one or more special symbols;

rotating all the reels containing the symbols used in the main game and the one or more special symbols such that the main game and the secondary game are played simultaneously;

randomly stopping all the reels;

granting an award to the player for winning symbol combinations obtained in the main game;

determining that the player has won the secondary game, whose outcome is determined solely by the final stop positions of the rightmost reel and the leftmost reel, wherein winning the secondary game is by at least one of the following events occurring: the special symbol on the leftmost reel stopping at a first position previously identified by a first indicator visible to the player at a start of the secondary game or the special symbol on the rightmost reel stopping at a second-position previously identified by a second indicator visible to the player at the start of the secondary game irrespective of the activated paylines in the main game, such that an outcome of the secondary game is not affected by the wager made to play the main game and an outcome of the main game is not affected by the wager to play the secondary game; and granting a reward for the player winning the secondary game.

2. The method of claim 1 wherein the reward for the player winning the secondary game is the initiation of a bonus game.

3. The method of claim 1 wherein there are five reels.

4. The method of claim 1 wherein, if the secondary game is not initiated, the main game is carried out in the same way it is carried out when the secondary game is initiated.

5. The method of claim 1 wherein initiating the secondary game only after the player meets certain criteria comprises initiating the secondary game after the player has made an additional wager, wherein additional special symbols are added to the reels as the player continues to increase the wager.

6. The method of claim 1 wherein a maximum of four special symbols are added to the reels.

7. The method of claim 1 wherein adding one or more special symbols to only the leftmost reel and the rightmost reel comprise activating images of special symbols.

8. The method of claim 1 wherein the step of determining that the player has won the secondary game comprises determining that the player has won the secondary game by the special symbol on the leftmost reel stopping at a first position previously identified by a first indicator visible to the player at a start of the secondary game and the special symbol on the rightmost reel stopping at a second-position previously identified by a second indicator visible to the player at the start of the secondary game.

9. A gaming device comprising:

a display screen:

a programmed processing system being programmed to carry out the following method:

carrying out a main game simultaneously with carrying out a secondary game, the main game comprising displaying a plurality of virtual reels side-by-side having symbols, where the reels, after being rotated and randomly stopped, display an array of symbols on a display screen, certain combinations of symbols along one or more activated paylines providing an award for a player, the plurality of reels comprising a leftmost reel, a rightmost reel, and one or more reels in-between, the secondary game comprising:

initiating the secondary game only after the player has made an additional wager to play the secondary game independent of a wager for playing the main game;

adding one or more special symbols to only the leftmost reel and the rightmost reel, but not the reels in-between, the added one or more special symbols not affecting a significance of symbols in the main game located at the same reel positions as the one or more special symbols;

rotating all the reels containing the symbols used in the main game and the one or more special symbols such that the main game and the secondary game are played simultaneously;

randomly stopping all the reels;

granting an award to the player for winning symbol combinations obtained in the main game;

determining that the player has won the secondary game, whose outcome is determined solely by the final stop positions of the rightmost reel and the leftmost reel, wherein winning the secondary game is by at least one of the following events occurring: the special symbol on the leftmost reel stopping at a first position previously identified by a first indicator visible to the player at a start of the secondary game and the special symbol on the rightmost reel stopping at a second-position previously identified by a second indicator visible to the player at the start of the secondary game irrespective of the activated paylines in the main game, such that an outcome of the secondary game is not affected by the wager made to play the main game and an outcome of the main game is not affected by the wager to play the secondary game; and granting a reward for the player winning the secondary game.

10. The device of claim 9 wherein the reward for the player winning the secondary game is the initiation of a bonus game.

11. The device of claim 9 wherein the step of determining that the player has won the secondary game comprises determining that the player has won the secondary game by the special symbol on the leftmost reel stopping at a first position previously identified by a first indicator visible to the player at a start of the secondary game and the special symbol on the rightmost reel stopping at a second-position previously identified by a second indicator visible to the player at the start of the secondary game.

* * * * *